United States Patent
May

[11] 3,712,664
[45] Jan. 23, 1973

[54] TRACTOR CAB
[75] Inventor: Oswald May, Bonn, Germany
[73] Assignee: Klockner-Humboldt-Deutz Aktiengesellschaft, Cologne-Deutz, Germany
[22] Filed: Sept. 16, 1970
[21] Appl. No.: 72,687

[30] Foreign Application Priority Data
Sept. 25, 1969 Germany..............P 19 48 395.5

[52] U.S. Cl...............296/102, 296/31 P, 296/97 R
[51] Int. Cl. ..........................................B62d 25/06
[58] Field of Search .....296/102, 137 R, 137 B, 31 P, 296/97 R; 280/150 C

[56] References Cited
UNITED STATES PATENTS

| 3,561,816 | 2/1971 | Koch | 296/102 |
| 3,244,251 | 4/1966 | Duncan | 280/105 C |
| 3,068,043 | 11/1962 | Komenda | 296/31 P |
| 2,911,232 | 11/1959 | Hastings | 296/102 |
| 2,805,887 | 9/1957 | Selby | 296/102 |
| 3,451,715 | 6/1969 | Stuckenberger | 296/102 |

Primary Examiner—Leo Friaglia
Attorney—Walter Becker

[57] ABSTRACT

A tractor cab with a detachable roof section which is connected to upwardly extending arms of a safety device designed to protect the tractor driver in case of overturn of the tractor, said roof section having a hollow profile filled with foamed synthetic material.

9 Claims, 5 Drawing Figures

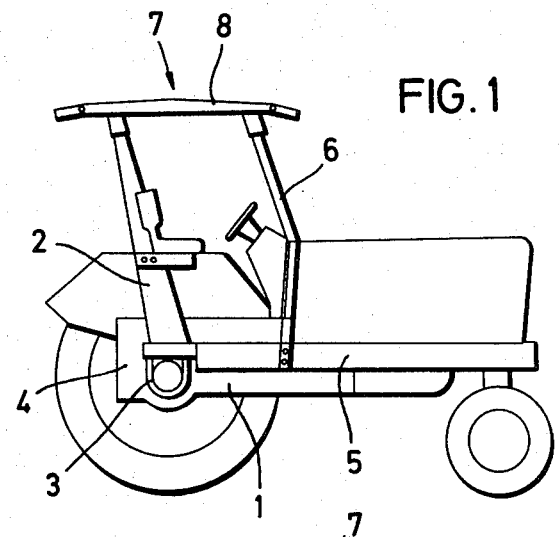
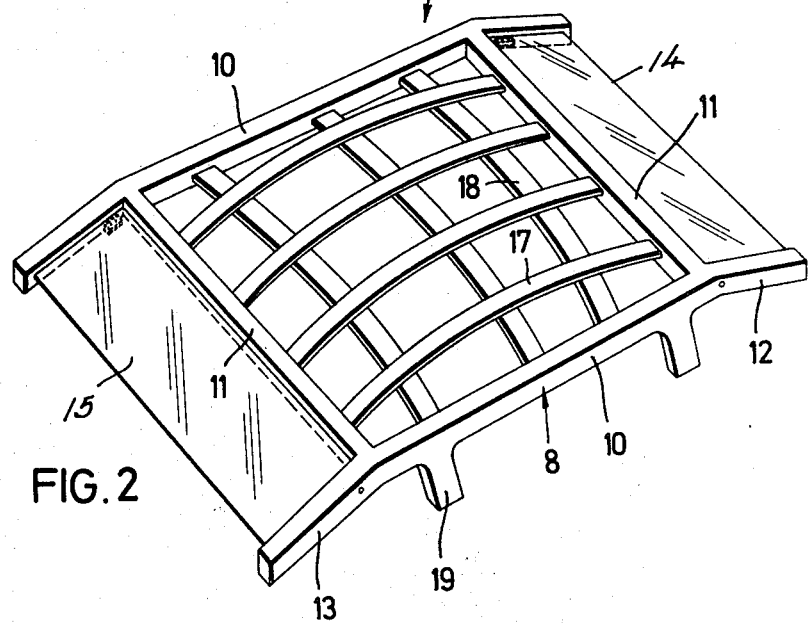

PATENTED JAN 23 1973

INVENTOR
Oswald May
BY
Walter Becker

TRACTOR CAB

The present invention relates to a tractor cab which has a roof section which is detachably connected to the upwardly extending arms of a safety device designed to protect in case of overturn. These arms are lateral to the tractor body and rise above the head of the driver.

It is know to put a safety device in case of overturn formed of a one piece U-shaped arm on a tractor cab. Under the crosspiece of this arm a corresponding U-shaped arched roof section can be hung on so as to jut out to the front and rear. A drawback to this tractor cab is that in the event that the tractor turns over, the driver is not adequately protected against head or arm injuries. This is due to the fact that the roof portion, as a result of insufficient rigidity, becomes deformed when the tractor turns over, and furthermore, because the roof portion lacks sufficient padding. The roof section of such a tractor cab can be easily produced from molded or pressed parts. However, the production becomes considerably expensive through the connecting of the two arms to a U-shaped safety device in case of overturn. In addition, the accessory or spare parts are bulky sections to transport. There is also the drawback that the roof section, because of its insufficient rigidity, is not suitable for supporting other cab parts, such as side windows and a front pane, without vibrating.

Starting with the state of the art, it is an object of the present invention to improve the tractor cab described above so that a roof portion results which is of a reasonable cost, rigid to bending and twisting, and is easily removable. It is to offer the driver the greatest possible safety against outside effects and injuries from within. It is a further object of the invention that the roof portion allow a simple manufacture of the arms which serve in the safety in case of overturn. In addition, the roof portion should have good muffling or silencing effects.

These and other objects and advantages of the invention will appear more clearly from the following specification in connection with the accompanying drawings in which:

FIG. 1 is a side view of a tractor with a cab according to the invention.

FIG. 2 represents an isometric view of the frame for the roof portion of the cab according to the invention with spars or ribs inserted, the frame being shown before it is placed in a form where synthetic material is brought in and foamed.

Figure 3:
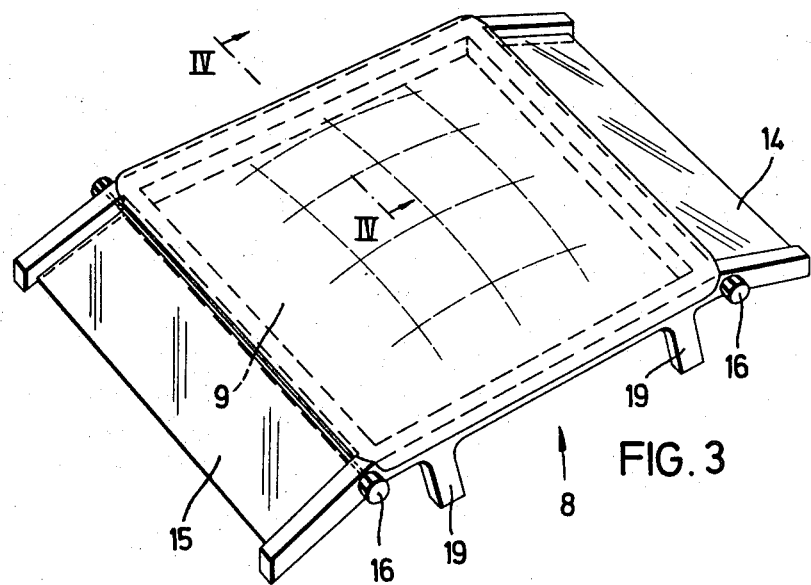
FIG. 3 is an isometric view of the roof portion of the tractor cab according to the invention, in a finished state.

The invention is characterized in that the roof portion has a frame, preferably constructed with a hollow profile, which is filled with a foamable synthetic material. The roof side of the foamed synthetic material should have a weatherproof outer layer. With a tractor cab of this type the roof section can now be satisfactorily made in a bending and twisting resistant manner of sufficient length and width. By means of the foamed synthetic material, the tractor driver is substantially protected against head injuries in the event of accidents. In order, in the event that the tractor turns over about the rear or front axle, to avoid with assurance arm injuries to the driver because of his embracing the arm of the safety device in case of overturn, it is further proposed according to the invention, that the frame have overhangs which project over the transverse bracings to the front and rear and which serve in case of overturn. Because of the cost, the overhangs, which project to the front and rear of the frame, are expediently made by lengthening the longitudinal bracings. In case a free arm should, in the event of an accident, reach out between the ground and a lateral arm of the safety device to protect in case of overturn, it is further proposed according to the invention that the frame have overhangs which project to both sides over the longitudinal bracings and which serve the protection in case of overturn. These overhangs can be conveniently made by lengthening the transverse bracings. An advantageous further use for the overhangs is as mountings for sun shields, preferably adjustable.

Simple bending and twisting resistant easily detachable connections between the roof portion and the arms will be obtained according to a further feature of the invention if the frame has socket-shaped portions for the connection with the arms of the safety device to protect in case of overturn. These socket-shaped portions are preferably welded or similarly connected to the underside of the longitudinal or transverse bracings. For reasons of strength and manufacturing it is expedient to provide the hollow profiles for the frame, the overhangs, and the socket-shaped portions with box-like cross sections.

Increased safety of the driver against head injuries in the event of overturn of the tractor results further according to the invention if the spars or ribs, which bridge the longitudinal bracings and are inserted in them, are embedded in the foamed synthetic material. In this connection, a further strengthening of the roof portion can be obtained if the spars or ribs, which bridge the transverse bracings and are inserted in them, are embedded in the foamed synthetic material. To create a resilient roof portion, which considerably increases the safety of the driver, it is further proposed that the spars or ribs be inserted, axially preloaded, between the longitudinal or transverse bracings. This brings about in particular that by means of the resiliency of the spars or ribs, the shock of overturning is considerably lessened. A simple and easily produceable mounting of the spars or ribs results if the spars or ribs are of a rectangular or round cross section. It is further within the scope of the invention, that the weatherproof outer layer of the roof portion be formed, at the time of the manufacture of the synthetic material, by thermal and/or chemical means. In addition, there is the possibility that foil, out of synthetic material, which is passed about the longitudinal and transverse bracings, be used as a weatherproof outer layer. This foil would be connected to the foamable synthetic material by adhesion or by means of the foaming process of the foamable synthetic material.

Referring now to the drawings in detail, the tractor shown in FIG. 1 has arms 2 of a safety device in case of overturn. These arms are located laterally of the body and extend upwardly over the head of the driver. Said arms are bend and torsion resistant and are braced with the drive axle tube 3 of a drive axle housing 4. The frame-like sections 5 are arranged on the tractor body 1. The arms 6 located laterally of the frame are placed on the steering wheel region. These arms also extend upwardly over the head of the driver and are an additional protection in case of overturn. The arms 2 and 6, which extend upwardly from both sides of the tractor body 1, are connected to one another by means of a roof portion 7. According to the invention, this roof portion has a frame 8 constructed with a hollow profile, which is filled in with a foamable synthetic material, preferably soft elastic polyurethane foam 9 (FIG. 3).

As FIG. 2 shows particularly well, prior to being fully assembled, the frame 8, with longitudinal bracing 10 and transverse bracing 11, composes a preferably box type hollow section. To prevent a continuous pivoting around the driving axle and as an increased protection in the event of an accident, the longitudinal bracings 10 are provided with overhangs 12 or 13 to the front and to the rear. These overhangs preferably serve as mountings for sun shields 14 or 15 in the front or rear. The sun shields 14, 15 are supported in the overhangs 12 or 13 by pins not shown in detail, and by means of lateral handles or knobs 16 (FIG. 3) can be adjusted in different angled settings. The inner surfaces of the longitudinal bracing 10 which face one another, and similarly the inner surfaces of the transverse bracing 11 which face one another, are provided with rectangular cutouts not shown in detail. Longitudinal or transverse spars or ribs 17 or 18, axially preloaded, are inserted into the cutouts. In this way the frame 8 is additionally reinforced by means of a resilient or springy ribbed body. To connect the frame 8 to the arms 2 and 6, box-like hollow sectioned socket shaped portions 19 are welded to the bottom of longitudinal bracing 10. These socket shaped portions 19 can be axially coupled and secured to a corresponding matching profile of the arms 2 or 6.

Figure 4:
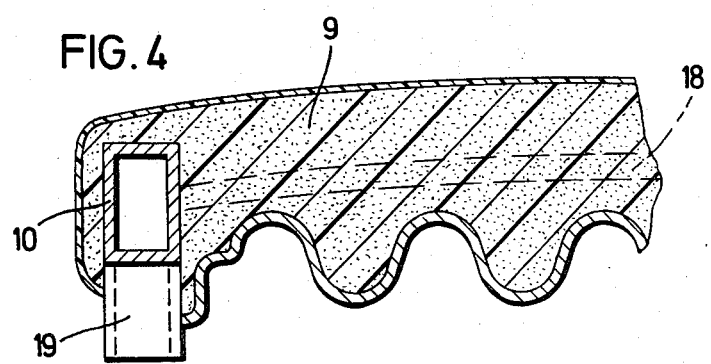
FIG. 4 represents an enlarged cross section of the line IV—IV of FIG. 3 according to the invention.

After the preassembly of the frame 8 according to FIG. 2, the frame is put in a foaming mold, in which foamable synthetic material, for example polyurethane, the manufacture of which has been so controlled as to produce a soft elastic polyurethane end product, is poured or blown in for the purpose of foaming. The synthetic material should be of such a consistency that by the foaming process a weatherproof and compacted or solidified outer layer is formed on the roof side, while the substance which surrounds the transverse ribs 18 should have an elastic structure capable of serving as padding. The mold receiving the frame 8 should be so constructed that, as seen in FIG. 4, the longitudinal and transverse bracings 10, 11 become embedded with the foaming of the synthetic material. The foaming mold should further be corrugated on the side which forms the inner surface of the roof section 7 (FIG.1). In this way a profile which silences or muffles and has a good padding will be formed. In this connection, for maintenance reasons, it is necessary that the outside surface layer, which covers up the porous core of the synthetic material, be closed in itself, but be of softer structure.

Instead of compacting or solidifying the foamable synthetic material by thermal or chemical means during the foaming into a weatherproof outer layer, there is in the scope of the invention the further possibility to cover the frame 8, as shown in FIG. 2, on the roof side and additionally on an inner side with a synthetic material foil before placing the frame in a form. The foil is passed around the longitudinal and transverse bracings, and the covered frame 8 is placed in a form. After the foamable polyurethane is poured or sprayed in, the synthetic material foil is connected with the elastic foamed synthetic material portion by means of the foaming process.

Figure 5:
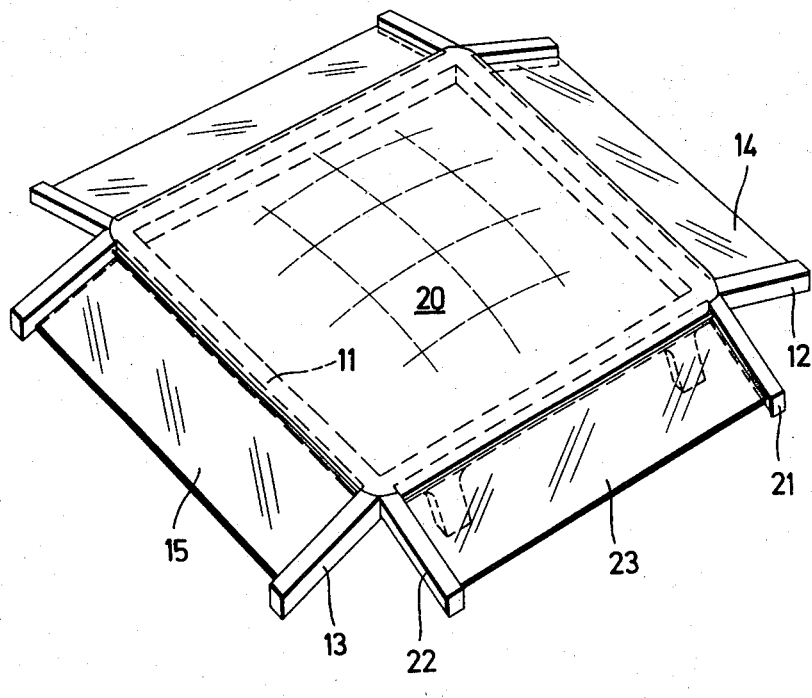
FIG. 5 shows a further embodiment of the roof portion of the tractor cab according to the invention.

The roof section 20 shown in FIG. 5 is a variation of FIGS. 2 and 3. Next to the overhangs 12 and 13 which protrude from the back and front are additional lateral overhangs 21 or 22. These overhangs 21, 22 which can advantageously serve as the mountings for lateral sun shields 23, are in this connection preferably formed by lengthening the transverse bracings 11.

It may be mentioned that instead of the mounting for sun shields, the overhangs 12, 13 or 21, 22 which protrude to the front, back, and side, may be bridged by axially preloaded spars or ribs, and like the inner space of the frame, may be filled in with foamable synthetic material, which flows or is sprayed into a form into which the overhangs are placed.

It is, of course, to be understood that the present invention is by no means limited to the specific showing in the drawings, but also comprises any modifications within the scope of the appended claims.

What I claim is:

1. A tractor having a body and a cab in which said cab comprises a roof section, arm means extending above head height of an operator upwardly from said tractor body on both sides thereof and detachably supporting said roof section, said roof section comprising self-contained frame means including hollow profile means formed by two longitudinal beams oppositely located and spaced relative to each other and two transverse beams oppositely located and spaced relative to each other so as to define free space therebetween and socket-shaped portions connected to the underside of said longitudinal beams and receiving the upper ends of said arm means for the connection of said roof portion to said arm means and also including axially preloaded longitudinal and transverse spar elements extending between and connected to said longitudinal and transverse beams and bowed upwardly with respect to said self-contained frame means, and cover means of foamed synthetic material having a weather-resistant external skin connected to said frame means and covering said spar elements to occupy and close said free space between said longitudinal and transverse beams.

2. A tractor according to claim 1 in which said foamed synthetic material is soft elastic polyurethane foam.

3. A tractor according to claim 1 in which said frame means are provided with overhangs which project beyond said transverse beams to the front and back of the tractor for protection in case of overturn of the tractor.

4. A tractor according to claim 3 in which the overhangs are formed by extensions of said longitudinal beams.

5. A tractor according to claim 3 which includes adjustable sun shields which are mounted on said overhangs.

6. A tractor according to claim 1 in which said frame means are provided with overhangs which respectively project to both sides of the tractor beyond the longitudinal beams for protection in case of overturn of the tractor.

7. A tractor according to claim 6 in which said overhangs are formed by extensions of said transverse beams.

8. A tractor according to claim 6 which includes adjustable sun shields which are mounted on said overhangs.

9. A tractor according to claim 1 in which said weather-resistant outer skin is a foil of synthetic material which is connected to said foamed synthetic material.

* * * * *